Aug. 19, 1924.
A. GRAVEL
1,505,332
WEATHER SCREEN FOR MOTOR VEHICLES
Filed Feb. 4, 1918
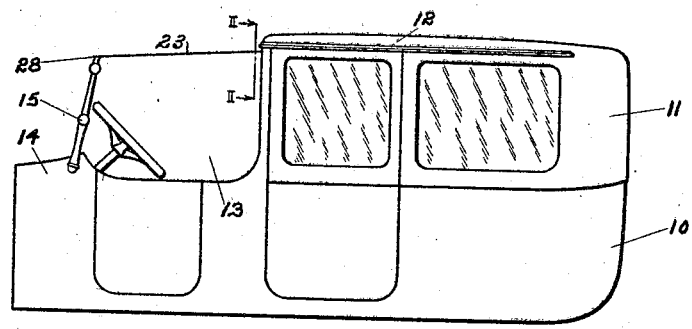
FIG. I.
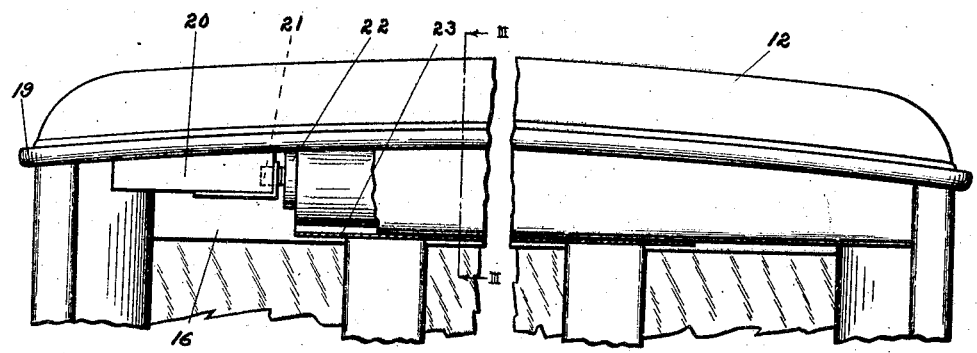
FIG. II.
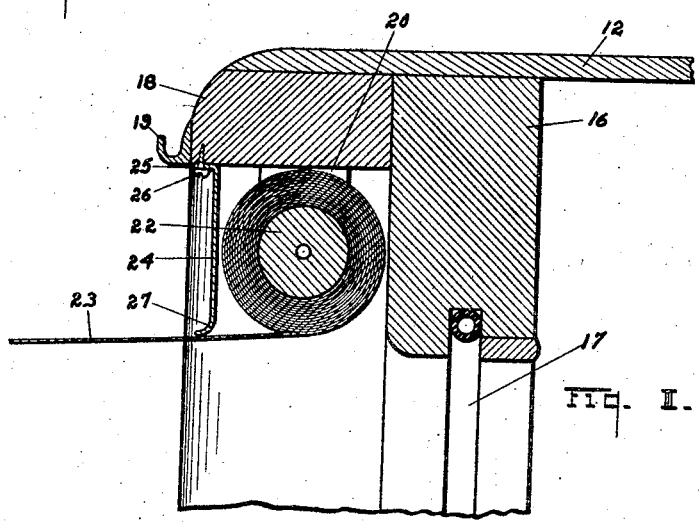
FIG. III.
Inventor
Abundius Gravel
By Chester H. Braselton
Attorney Patented Aug. 19, 1924.                                                  1,505,332

UNITED STATES PATENT OFFICE.

ABUNDIUS GRAVEL, OF TOLEDO, OHIO, ASSIGNOR TO THE WILLYS-OVERLAND COMPANY, OF TOLEDO, OHIO, A CORPORATION OF OHIO.

WEATHER SCREEN FOR MOTOR VEHICLES.

Application filed February 4, 1918. Serial No. 215,337.

*To all whom it may concern:*

Be it known that I, ABUNDIUS GRAVEL, a citizen of the United States, residing at Toledo, in the county of Lucas and State of Ohio, have invented certain new and useful Improvements in Weather Screens for Motor Vehicles, of which I declare the following to be a full, clear, and exact description.

This invention relates to an improved weather screen construction for motor vehicles.

The principal object of this invention is to provide an improved extension curtain or screen for use in protecting the driver in town cars or broughams, or similar closed cars in which the driver's seat is normally left unprotected.

A further object of this invention is to provide an extension screen for protecting the driver which is so constructed and mounted as to prevent rain from running back into the roller supporting the curtain.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which Fig. I is a side elevation of a motor vehicle embodying my invention.

Fig. II is an enlarged, detail, fragmentary, sectional view, taken substantially on the line II—II of Fig. I, and Fig. III is a fragmentary, detail, sectional view, taken substantially on the line III—III of Fig. II.

In the drawing, similar reference numerals refer to similar parts throughout the several views, and the sectional views are taken looking in the direction of the little arrows at the ends of the section lines.

Considering the numbered parts of the drawing, I have shown a motor vehicle comprising the body 10 and the top 11 provided with permanent roof 12. The driver's compartment is represented at 13, the cowl at 14 and the windshield at 15. All of this is of the usual construction common in town cars or broughams. A partition 16 extends across the front of the passenger compartment of the body behind the driver's seat, said partition having a space for a sliding window 17. A bar 18 extends across the front of the permanent roof 12 in front of the partition 16, and a gutter 19 may be affixed to the edge of the top 12 as shown in Figs. II and III of the drawing. Blocks 20 are secured to the lower surface of the cross bar 18 and support the trunnions 21 of a roller 22. This roller is spring-actuated and is of the type commonly known as curtain roller. A curtain of waterproof material is secured at one end to the roller 22 and rolled thereon, as shown in Fig. III and the other end of said curtain is adapted to be secured to the upper edge of the windshield 15 by means of detachable fasteners at the points 28. A strip of metal 24 extends across the front of the top 12 having a flange 25 at the upper edge, turned laterally and secured to the cross bar 18 by means of screws 26. The lower edge of the strip 24 curves outwardly at 27 and extends to a position slightly below the lower edge of the roll of fabric on the roller 22, so that the curved edge 27 of the strip 24 engages the curtain 23 when the curtain is fastened to the top of the windshield.

From the description of the parts given above, the operation of this device should be very readily understood. In fair weather the curtain 23 is disconnected from the windshield 15 and the spring tension roller 22 rolls the curtain up on itself so that it is stored on said roller behind the strip 24, thus effectually concealing the roller and the curtain stored thereon from sight. In stormy weather when it is desired to protect the driver, the curtain is drawn outwardly and fastened to the top of the windshield by the fasteners 28 and in this position the lower edge of the strip 24, that is the curved portion 27 thereof, engages with the curtain 23 and slightly depresses the same. The result of this is that any rain or moisture accumulating on the top of the curtain 23 cannot run back into the roller 22, but drains off of the curtain 23 over the side thereof or over the windshield.

I am aware that the particular embodiment of my invention, which I have here shown and described, is susceptible of considerable variation without departing from the spirit thereof, and, therefore, I desire to claim the same broadly, as well as specifically, as indicated by the appended claims.

Having thus described my invention, what I claim as new and desire to secure by Letters Patent, is:

1. The combination with a vehicle having a top and a windshield; of a roller supported beneath a forwardly extending portion of said top; a curtain mounted at one end on said roller to wind and unwind from the bottom thereof and adapted to be connected at the other end to said windshield; and a strip secured at its upper edge to said top in front of said roller, and having its lower edge in engagement with said curtain when said curtain is in extended position.

2. The combination with a vehicle having a top and a windshield; of a roller carried by said top; a curtain mounted at one end on said roller to wind and unwind from the bottom thereof and adapted to be connected at the other end to said windshield; and a strip secured at its upper edge to said top in front of said roller, having its lower edge extending downwardly slightly further than the lower edge of said roller and engaging said curtain when the latter is in extended position.

3. In combination, a vehicle provided with a driver's seat, a windshield in front thereof, a partition to the rear thereof, a curtain roller mounted in front of said partition, a ledge extending forward from said partition above said roller, a guard depending from said ledge in front of said roller, and a curtain mounted at one end upon said roller to wind and unwind from the lower side thereof, and adapted when in its extended position, to engage the lower edge of said guard and to be connected at its forward end to the windshield.

In testimony whereof, I affix my signature.

ABUNDIUS GRAVEL.